(12) United States Patent
Kim et al.

(10) Patent No.: US 11,029,220 B2
(45) Date of Patent: Jun. 8, 2021

(54) PRESSURE SENSING ELEMENT (AND SAFETY APPARATUS) HAVING INTERMEDIATE LAYER WITH TWO FUNCTIONAL LAYERS

(71) Applicant: LG INNOTEK CO., LTD., Seoul (KR)

(72) Inventors: Bi Yi Kim, Seoul (KR); Jeong Han Kim, Seoul (KR); Hyun Gyu Park, Seoul (KR); Won Keun Cho, Seoul (KR); In Hee Cho, Seoul (KR); Hyun Jin Jo, Seoul (KR); Seung Kwon Hong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 225 days.

(21) Appl. No.: 15/757,526

(22) PCT Filed: Dec. 21, 2015

(86) PCT No.: PCT/KR2015/014017
§ 371 (c)(1),
(2) Date: Mar. 5, 2018

(87) PCT Pub. No.: WO2017/039079
PCT Pub. Date: Mar. 9, 2017

(65) Prior Publication Data
US 2018/0348072 A1 Dec. 6, 2018

(30) Foreign Application Priority Data
Sep. 3, 2015 (KR) .......................... 10-2015-0125075

(51) Int. Cl.
*G01L 1/14* (2006.01)
*G01L 5/22* (2006.01)
(Continued)

(52) U.S. Cl.
CPC ................. *G01L 1/14* (2013.01); *G01L 1/142* (2013.01); *G01L 1/18* (2013.01); *G01L 1/2287* (2013.01); *G01L 5/22* (2013.01)

(58) Field of Classification Search
CPC .............................. G01L 1/146; G01L 1/142
See application file for complete search history.

(56) References Cited

U.S. PATENT DOCUMENTS 4,644,801 A * 2/1987 Kustanovich ........... G01L 1/146
361/283.1
4,836,033 A * 6/1989 Seitz .................... A61B 5/1036
361/291
(Continued)

FOREIGN PATENT DOCUMENTS

JP H06-323929 11/1994
JP 2000-097794 4/2000

OTHER PUBLICATIONS

International Search Report (with English Translation) and Written Opinion dated May 11, 2016 issued in Application No. PCT/KR2015/014017.

*Primary Examiner* — Tran M. Tran
(74) *Attorney, Agent, or Firm* — KED & Associates LLP

(57) ABSTRACT

A pressure sensing element may include: an intermediate layer having a structure in which at least two functional layers are stacked on each other; a first electrode layer including a plurality of first electrode patterns; and a second electrode layer to overlap the first electrode layer with the intermediate layer between the first and second electrode layers. Among the two functional layers, the first functional layer has a thickness linearly varying in a first pressure section, and the second functional layer has a thickness linearly varying in a second pressure section. The maximum pressure in the first pressure section is lower than that in the second pressure section, and the minimum pressure in the
(Continued)

second pressure section is included in the first pressure section.

18 Claims, 9 Drawing Sheets

(51) Int. Cl.
  *G01L 1/22* (2006.01)
  *G01L 1/18* (2006.01)

(56) References Cited

U.S. PATENT DOCUMENTS

| | | | | |
|---|---|---|---|---|
| 5,010,774 A * | 4/1991 | Kikuo | B25J 13/084 338/114 |
| 5,054,323 A * | 10/1991 | Hubbard, Jr. | G01L 1/18 73/754 |
| 5,060,527 A * | 10/1991 | Burgess | G01L 1/205 338/47 |
| 5,693,886 A | 12/1997 | Seimiya et al. | |
| 5,886,615 A * | 3/1999 | Burgess | H01H 1/029 200/86 R |
| 5,962,118 A * | 10/1999 | Burgess | H01H 1/029 252/503 |
| 6,026,694 A | 2/2000 | Glenn | |
| 6,033,370 A * | 3/2000 | Reinbold | A61B 5/6806 600/595 |
| 6,999,301 B1 * | 2/2006 | Sanftleben | G01G 7/06 340/438 |
| 7,119,705 B2 * | 10/2006 | Manlove | B60N 2/002 340/667 |
| 7,145,432 B2 * | 12/2006 | Lussey | H01H 3/141 338/47 |
| 7,159,471 B2 * | 1/2007 | Fortune | G01G 7/06 177/210 C |
| 7,176,390 B2 * | 2/2007 | Hansen | G01G 7/06 177/136 |
| 7,548,015 B2 * | 6/2009 | Benslimane | B81B 3/007 310/363 |
| 7,703,341 B2 * | 4/2010 | Ogawa | G01L 1/14 73/862.046 |
| 8,181,338 B2 * | 5/2012 | Benslimane | B81B 3/0021 29/825 |
| 8,451,011 B2 * | 5/2013 | Hayakawa | G01L 1/142 324/658 |
| 8,528,411 B2 * | 9/2013 | Matsumoto | C08G 18/12 73/715 |
| 9,448,127 B2 * | 9/2016 | Cannard | G01L 1/18 |
| 9,671,297 B2 * | 6/2017 | Sibbett | B25J 19/02 |
| 9,700,258 B2 * | 7/2017 | Jiang | A61F 2/80 |
| 9,904,395 B2 * | 2/2018 | Ogura | G06F 3/0414 |
| 10,310,659 B2 * | 6/2019 | Nathan | G06F 3/0443 |
| 10,318,038 B2 * | 6/2019 | Nathan | G06F 3/04166 |
| 10,337,849 B2 * | 7/2019 | Otaka | G01D 5/2405 |
| 10,378,983 B2 * | 8/2019 | Shere | G01L 9/12 |
| 2007/0246120 A1 * | 10/2007 | Krobok | B60N 2/002 139/421 |
| 2012/0116251 A1 * | 5/2012 | Ben-Shalom | A61B 5/11 600/587 |
| 2014/0037909 A1 | 2/2014 | Hawwa et al. | |
| 2014/0097651 A1 * | 4/2014 | Fortune | B60R 21/01532 297/180.12 |
| 2016/0283006 A1 * | 9/2016 | Ogura | G06F 3/0414 |
| 2019/0049322 A1 * | 2/2019 | James | A47C 31/126 |

* cited by examiner

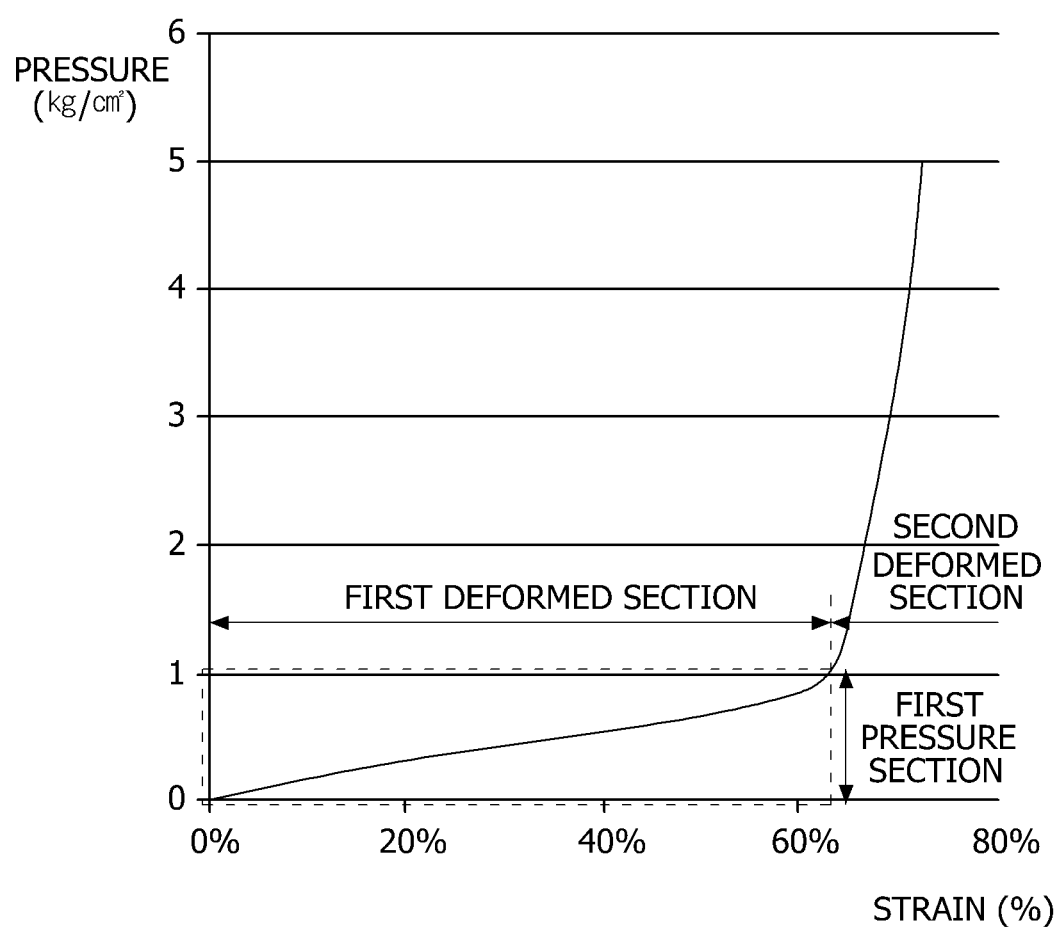

PRESSURE SENSING ELEMENT (AND SAFETY APPARATUS) HAVING INTERMEDIATE LAYER WITH TWO FUNCTIONAL LAYERS

CROSS-REFERENCE TO RELATED PATENT APPLICATIONS

This application is a U.S. National Stage Application under 35 U.S.C. § 371 of PCT Application No. PCT/KR2015/014017, filed Dec. 21, 2015, which claims priority to Korean Patent Application No. 10-2015-0125075, filed Sep. 3, 2015, whose entire disclosures are hereby incorporated by reference.

TECHNICAL FIELD

The present invention relates to a pressure sensing element, and more particularly, to a pressure sensing element having an expanded pressure sensing section, and a safety apparatus including the same.

BACKGROUND ART

In addition to home safety elements, elements for sensing a pressure in a variety of applications utilizing a body pressure distribution are required. Generally, a pressure sensing element includes a lower electrode, an intermediate layer disposed on the lower electrode, and an upper electrode disposed on the intermediate layer. The performance of the pressure sensing element is affected by a dielectric constant and a thickness of the intermediate layer and widths of the electrodes. Specifically, the pressure sensing performance may be lowered according to a surrounding environment such as temperature, humidity, and the like.

In the pressure sensing element, since the thickness of the intermediate layer is reduced by an external pressure, the applied pressure may be sensed by a change in the thickness of the intermediate layer.

Generally, however, an intermediate layer has a very short pressure section in which a thickness of the intermediate layer linearly varies by an external pressure, and there is a limit in increasing only a pressure range in which the thickness varies linearly while maintaining other properties such as elasticity, a restoring force, and the like.

DISCLOSURE

Technical Problem

The present invention is directed to providing a pressure sensing element including an intermediate layer having a wide pressure section in which a thickness of the intermediate layer varies linearly, and a safety apparatus including the same.

Technical Solution

One aspect of the present invention provides a pressure sensing element including: an intermediate layer having a structure in which at least two functional layers are stacked; a first electrode layer disposed on one surface of the intermediate layer and including a plurality of first electrode patterns; and a second electrode layer disposed on the other surface of the intermediate layer to overlap the first electrode layer with the intermediate layer between the first electrode layer and the second electrode layer, wherein among the at least two functional layers, a first functional layer has a thickness linearly varying in a first pressure section, a second functional layer has a thickness linearly varying in a second pressure section, a maximum pressure in the first pressure section is lower than a maximum pressure in the second pressure section, and a minimum pressure in the second pressure section is included in the first pressure section.

Another aspect of the present invention provides a safety apparatus including: a pressure sensing element including an intermediate layer having a structure in which at least two functional layers are stacked, a first electrode layer disposed on one surface of the intermediate layer and including a plurality of first electrode patterns, and a second electrode layer disposed on the other surface of the intermediate layer to overlap the first electrode layer with the intermediate layer between the first electrode layer and the second electrode layer, wherein among the at least two functional layers, a first functional layer has a thickness linearly varying in a first pressure section, a second functional layer has a thickness linearly varying in a second pressure section, a maximum pressure in the first pressure section is lower than a maximum pressure in the second pressure section, and a minimum pressure in the second pressure section is included in the first pressure section; a control unit configured to generate a control signal according to a change in a thickness of the intermediate layer; and an output unit configured to output the control signal.

Advantageous Effects

In a pressure sensing element and a safety apparatus including the same according to an embodiment of the present invention, an intermediate layer between first and second electrode layers includes at least two functional layers having different sections in which thicknesses of the functional layers linearly vary according to a pressure, and thus a pressure range in which the intermediate layer can sense the pressure can be increased.

DESCRIPTION OF DRAWINGS

FIG. 2A is a graph showing a change in a thickness of a first functional layer of FIG. 1 according to a pressure.

MODES OF THE INVENTION

Figure 1:
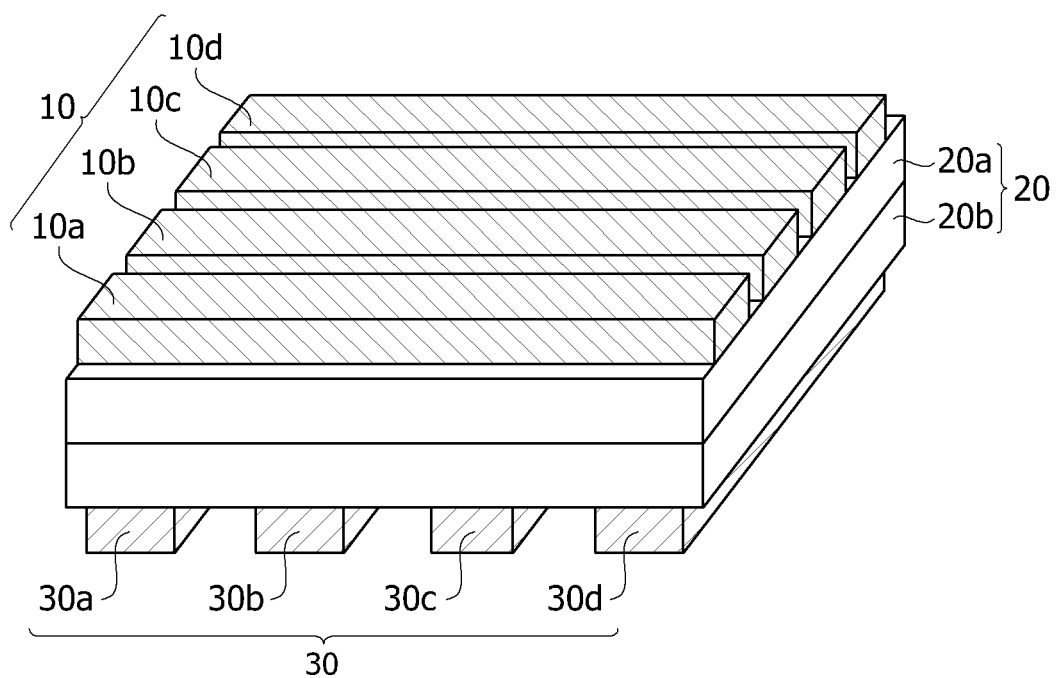
FIG. 1 is a perspective view of a pressure sensing element according to an embodiment of the present invention.

While the present invention is susceptible to various modifications and alternative forms, specific embodiments thereof are shown by way of example in the drawings and will herein be described. It should be understood, however, that there is no intent to limit the present invention to the particular forms disclosed, but on the contrary, the present invention is to cover all modifications, equivalents, and alternatives falling within the spirit and scope of the present invention.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It should be understood that when an element is referred to as being "connected" or "coupled" to another element, it can be directly connected or coupled to the other element or intervening elements may be present. In contrast, it should be understood that when an element is referred to as being "directly connected" or "directly coupled" to another element, there are no intervening elements present.

The terminology used herein is for the purpose of describing particular embodiments only and is not intended to be limiting of the present invention. As used herein, the singular forms "a," and "an" are intended to include the plural forms as well, unless the context clearly indicates otherwise. It should be further understood that the terms "comprise," "comprising," "include," and/or "including," when used herein, specify the presence of stated features, integers, steps, operations, elements, parts, or combination thereof, but do not preclude the presence or addition of one or more other features, integers, steps, operations, elements, parts, or combination thereof.

Unless otherwise defined, all terms (including technical and scientific terms) used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings. In order to facilitate overall understanding of the present invention, like reference numerals in the drawings denote like elements, and thus the description thereof will not be repeated.

Hereinafter, a pressure sensing element according to an embodiment of the present invention will be described in detail with reference to the accompanying drawings.

FIG. 1 is a perspective view of the pressure sensing element according to the embodiment of the present invention.

As shown in FIG. 1, the pressure sensing element according to the embodiment of the present invention includes an intermediate layer 20, a first electrode layer 10 disposed on a first surface of the intermediate layer 20 and including a plurality of first electrode patterns 10a, 10b, 10c, and 10d which are arranged in a first direction, and a second electrode layer 30 disposed on a second surface of the intermediate layer 20 opposite the first surface. The second electrode layer 30 includes a plurality of second electrode patterns 30a, 30b, 30c, and 30d which are arranged in a second direction crossing the first direction. Although four first electrode patterns 10a, 10b, 10c, and 10d and four second electrode patterns 30a, 30b, 30c, and 30d are shown in the drawing, the number of the first electrode patterns 10a, 10b, 10c, and 10d and the number of the second electrode patterns 30a, 30b, 30c, and 30d are not limited thereto.

When a pressure is applied from the outside to the pressure sensing element, a thickness of the intermediate layer 20 in a region in which the pressure is applied varies. When the pressure is applied to the pressure sensing element, a distance between the first electrode layer 10 and the second electrode layer 30 at a point at which the pressure is applied is reduced. In this case, a degree of decrease in a thickness of the intermediate layer 20 between the first electrode layer 10 and the second electrode layer 30 varies according to the applied pressure. Therefore, the pressure sensing element according to the embodiment of the present invention may sense a weight according to a degree of a change in the thickness of the intermediate layer 20.

Generally, however, a section in which the thickness of the intermediate layer 20 linearly varies by an external pressure is very short. For example, when a pressure sensing element having an insole shape is manufactured, a required sensing range of the pressure sensing element ranges from about 0.5 kg/cm$^2$ to 5 kg/cm$^2$. However, the thickness of the intermediate layer 20 is difficult to linearly vary in such a wide pressure range.

Therefore, the pressure sensing element according to the embodiment of the present invention includes the intermediate layer 20 having a structure, in which two first and second functional layers 20a and 20b having different sections in which thicknesses of the functional layers 20a and 20b vary linearly according to a pressure are stacked.

Specifically, the thickness of the first functional layer 20a linearly varies in a first pressure section and the thickness of the second functional layer 20b linearly varies in a second pressure section, so that the thickness of the intermediate layer 20 may linearly vary in the first pressure section and the second pressure section. To this end, when a maximum pressure in the first pressure section is lower than a maximum pressure in the second pressure section, a minimum pressure in the second pressure section is included in the first pressure section. Specifically, when the maximum pressure in the first pressure section is lower than the maximum pressure in the second pressure section, the intermediate layer 20 has a structure in which the first functional layer 20a is stacked on the second functional layer 20b. Although not shown, an adhesion layer may be further formed between the first functional layer 20a and the second functional layer 20b.

In the embodiment of the present invention, the case in which the minimum pressure in the second pressure section is equal to the maximum pressure in the first pressure section will be described.

Figure 2B:
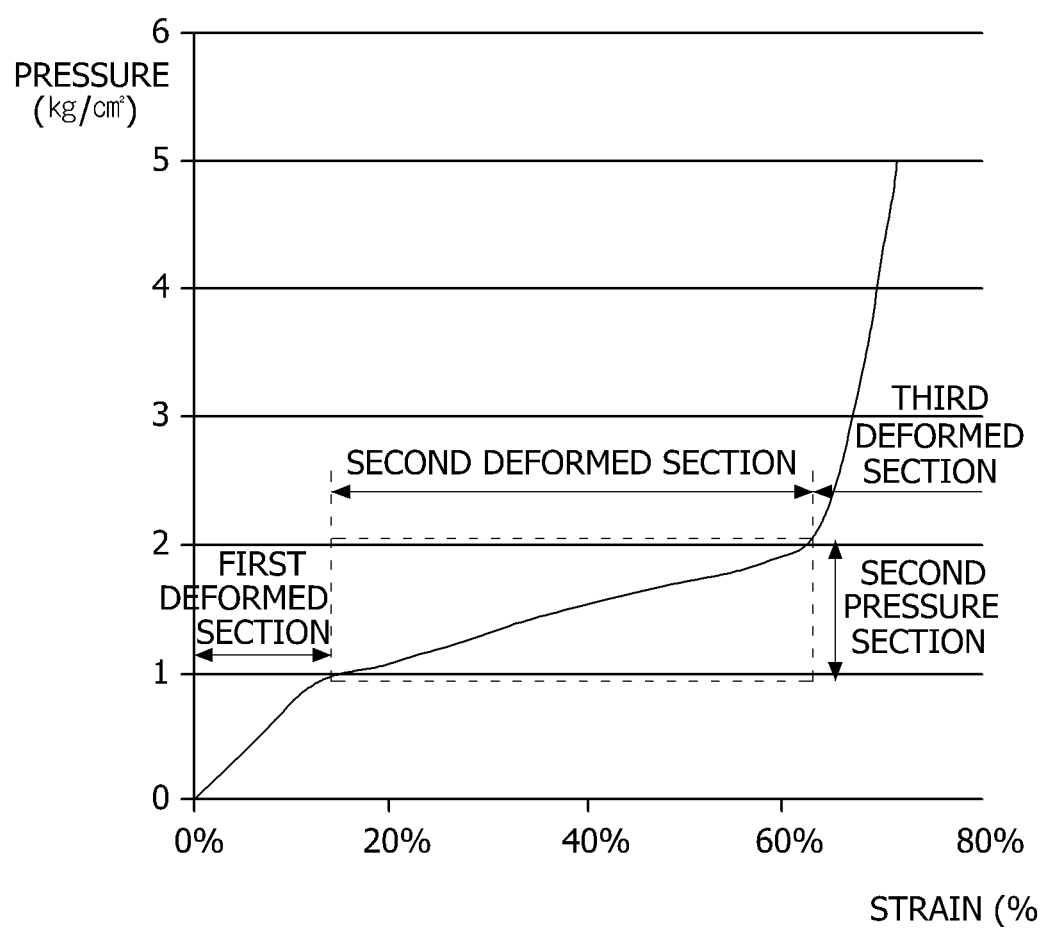
FIG. 2B is a graph showing a change in a thickness of a second functional layer of FIG. 1 according to a pressure.
Figure 2C:
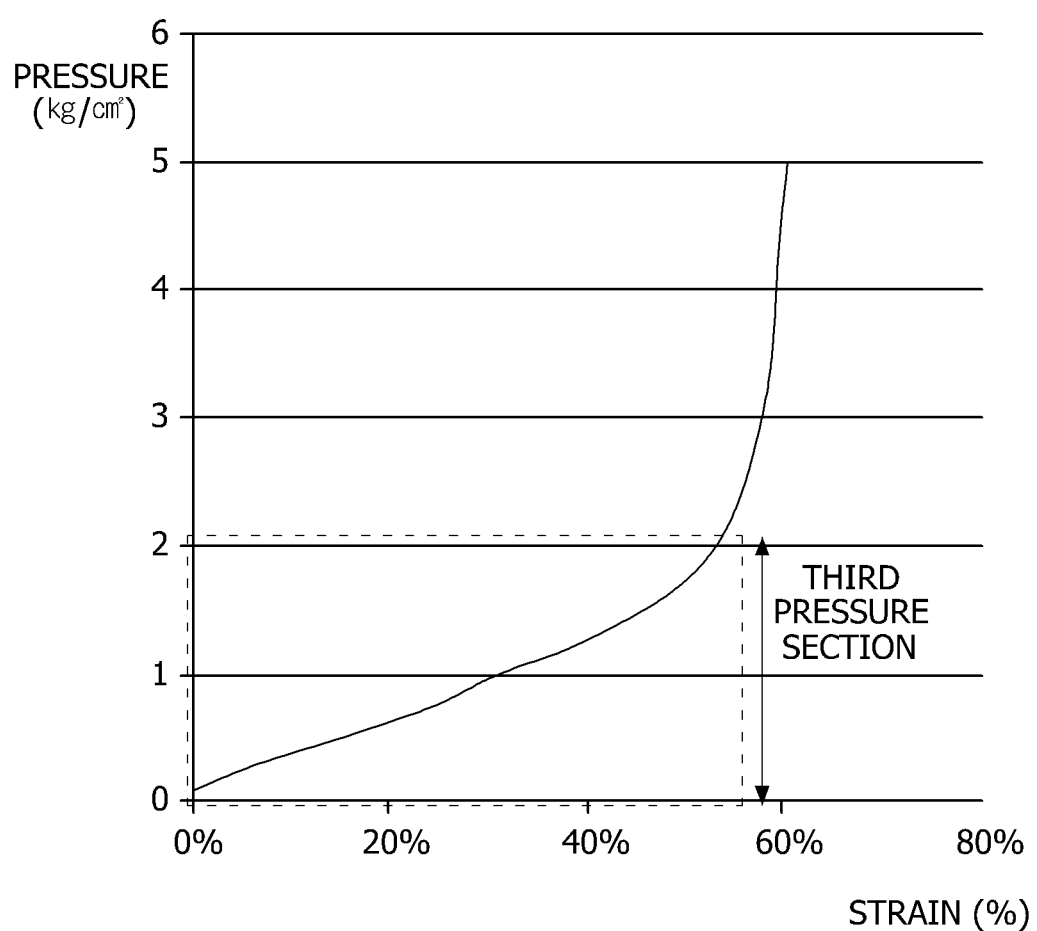
FIG. 2C is a graph showing a change in a thickness of an intermediate layer of FIG. 1 according to a pressure.

FIG. 2A is a graph showing a change in the thickness of the first functional layer of FIG. 1 according to a pressure, and FIG. 2B is a graph showing a change in the thickness of the second functional layer of FIG. 1 according to a pressure. FIG. 2C is a graph showing a change in the thickness of the intermediate layer of FIG. 1 according to a pressure.

For example, as shown in FIG. 2A, a degree of deformation of the thickness of the first functional layer 20a is changed according to a pressure on the basis of 1 kg/cm$^2$. The first functional layer 20a has a first deformed section and a second deformed section. In the first deformed section, when the pressure is less than 1 kg/cm$^2$, the thickness of the first functional layer 20a is constantly reduced to about 60% of an initial thickness (0% strain) as the pressure increases. In the second deformed section, when the pressure is 1 kg/cm² or more, the degree of deformation of the thickness of the first functional layer 20a is lower than that in the first deformed section as the pressure increases.

In this case, the first pressure section of the first functional layer 20a may be defined as a pressure of 0 kg/cm² to 1 kg/cm², which is a pressure in the first deformed section which is the longest section among the sections in which a strain of the first functional layer 20a, that is, the thickness of the first functional layer 20a, varies linearly.

As shown in FIG. 2B, the second functional layer 20b has a first deformed section in which the thickness of the second functional layer 20b is constantly reduced to about 20% of an initial thickness (0% strain), a second deformed section having a gradient different from a gradient of the first deformed section and in which the thickness of the second functional layer 20b is reduced to a range from 20% to 60%, and a third deformed section in which the pressure is 2 kg/cm² or more. In this case, the second pressure section of the second functional layer 20b is defined as a pressure of 1 kg/cm² to 2 kg/cm², which is a pressure in the second deformed section which is the longest section among the sections in which the thickness of the second functional layer 20b varies linearly.

Therefore, as shown in FIG. 2C, the thickness of the intermediate layer 20 having a structure in which the first and second functional layers 20a and 20b are stacked varies linearly in a third pressure section of 0 kg/cm² to 2 kg/cm² including a pressure of 0 kg/cm², which is a minimum pressure in the first pressure section, and a pressure of 2 kg/cm², which is the maximum pressure in the second pressure section. That is, the pressure sensing element of FIG. 1 may have a pressure sensing section having a pressure of 0 kg/cm² to 2 kg/cm².

Specifically, in order to linearly vary the thickness of the intermediate layer 20 in the structure in which the first and second functional layers 20a and 20b are stacked, the first pressure section and the second pressure section should partially overlap. To this end, as described above, the minimum pressure in the second pressure section and the maximum pressure in the first pressure section should be the same, or the minimum pressure in the second pressure section should be included in the first pressure section.

Further, the first and second functional layers 20a and 20b should satisfy the following Expression 1.

$$1 < CFD_{second\ functional\ layer} 25\% / CFD_{first\ functional\ layer} 25\% \leq 20, \quad \text{Expression 1}$$

(Compression Force Deflection; CFD)

As shown in Expression 1, $CFD_{first\ functional\ layer} 25\%$, which is a pressure at which the thickness of the first functional layer 20a is reduced by 25%, is lower than $CFD_{second\ functional\ layer} 25\%$, which is a pressure at which the thickness of the second functional layer 20b is reduced by 25%. This is because the maximum pressure in the first pressure section is lower than the maximum pressure in the second pressure section.

Further, when the $CFD_{second\ functional\ layer} 25\%$ is more than 20 times of the $CFD_{first\ functional\ layer} 25\%$, the intermediate layer 20 having the structure in which the first and second functional layers 20a and 20b are stacked is difficult to be deformed by an external pressure. For example, when the $CFD_{first\ functional\ layer} 25\%$ is 0.2 kg/cm² and the $CFD_{second\ functional\ layer} 25\%$ is more than 20 times of the $CFD_{first\ functional\ layer} 25\%$, the $CFD_{second\ functional\ layer} 25\%$ is more than 4 kg/cm². However, a material having $CFD_{second\ functional\ layer} 25\%$ of more than 4 kg/cm² is a rigid material having little deformation against pressure. Therefore, $CFD_{second\ functional\ layer} 25\%$ $CFD_{first\ functional\ layer} 25\%$ 20 is preferable.

Hereinafter, the case in which the thickness of the intermediate layer 20 is reduced by the external pressure will be described in detail.

When the external pressure is within the first pressure section, both of the thicknesses of the first and second functional layers 20a and 20b are reduced by the external pressure, and the thickness of the first functional layer 20a disposed on the intermediate layer 20 is further reduced than that of the second functional layer 20b.

When the external pressure is within the second pressure section, the thickness of the first functional layer 20a is maximally reduced within a range in which the thickness linearly varies by the external pressure. The thickness of the second functional layer 20b disposed below the first functional layer 20a is also reduced, and the thickness of the second functional layer 20b is 20% or more of an initial thickness and is preferably reduced within a range of 95% or less.

For example, in the case in which the initial thickness of the second functional layer 20b is 10 mm, when the thickness of the first functional layer 20a is maximally reduced, the thickness of the second functional layer 20b may range from 2 mm to 9.5 mm. This is because when the thickness of the first functional layer 20a is maximally reduced and the thickness of the second functional layer 20b is less than 2 mm, the second functional layer 20b is also almost maximally compressed, so that it is not necessary to stack the first and second functional layers 20a and 20b. Further, this is because when the thickness of the first functional layer 20a is maximally reduced and the thickness of the second functional layer 20b is more than 9.5 mm, an amount of a change in the thickness of the second functional layer 20b is insufficient so that the thickness of the intermediate layer 20 is difficult to be linearly reduced in the second pressure section.

Specifically, the pressure sensing element of the present invention may include an intermediate layer in which at least three functional layers are stacked.

Figure 3:
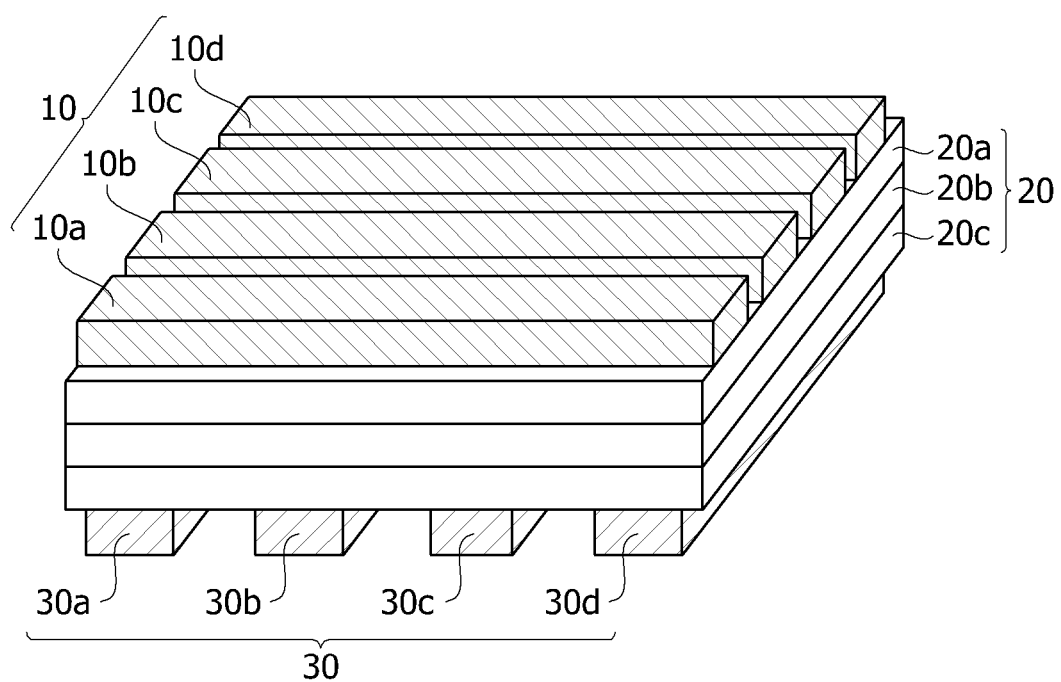
FIG. 3 is a perspective view of a pressure sensing element according to another embodiment of the present invention.
Figure 4A:
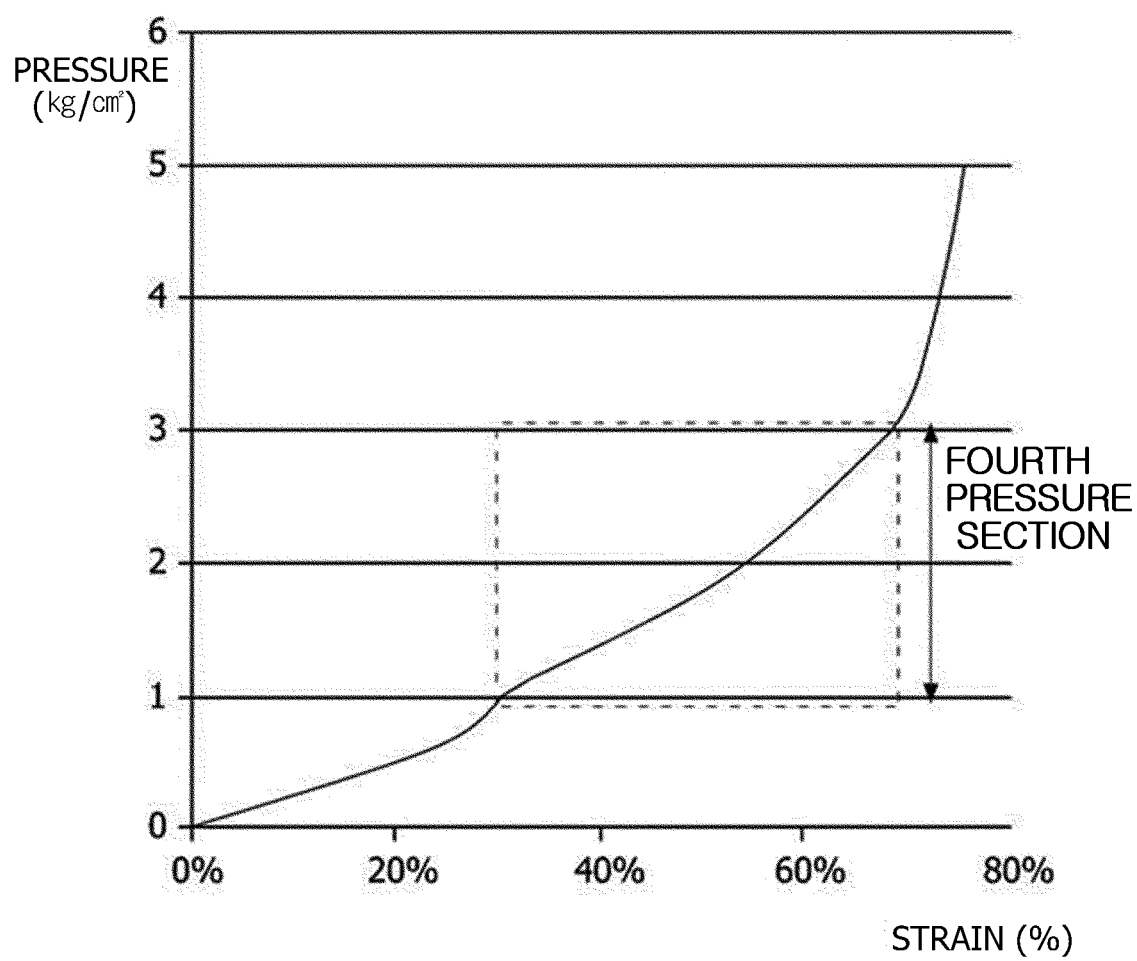
FIG. 4A is a graph showing a change in a thickness of a third functional layer of FIG. 3 according to a pressure.

FIG. 3 is a perspective view of a pressure sensing element according to another embodiment of the present invention. FIG. 4A is a graph showing a change in a thickness of a third functional layer of FIG. 3 according to a pressure, and FIG. 4B is a graph showing a change in a thickness of an intermediate layer of FIG. 3 according to a pressure.

As shown in FIG. 3, an intermediate layer 20 may have a structure in which first, second, and third functional layers 20a, 20b, and 20c are stacked. In this case, the functional layer 20c among the first, second, and third functional layers 20a, 20b, and 20c, which has the highest maximum pressure in a pressure section in which a thickness thereof varies linearly, is disposed at a lowermost portion of the intermediate layer 20, and the functional layer 20a among the first, second, and third functional layers 20a, 20b, and 20c, which has the lowest maximum pressure in a pressure section in which a thickness thereof varies linearly, is disposed at an uppermost portion of the intermediate layer 20.

For example, when a first pressure section of the first functional layer 20a ranges from 0 kg/cm² to 1 kg/cm² as shown in FIG. 2A and a second pressure section of the second functional layer 20b ranges from 1 kg/cm² to 2 kg/cm² as shown in FIG. 2B, a fourth pressure section of the third functional layer 20c may range from 1 kg/cm² to 3 kg/cm² as shown in FIG. 4A. In this case, a thickness of the intermediate layer 20 may linearly vary when a minimum pressure in the fourth pressure section is included in the second pressure section.

Figure 4B:
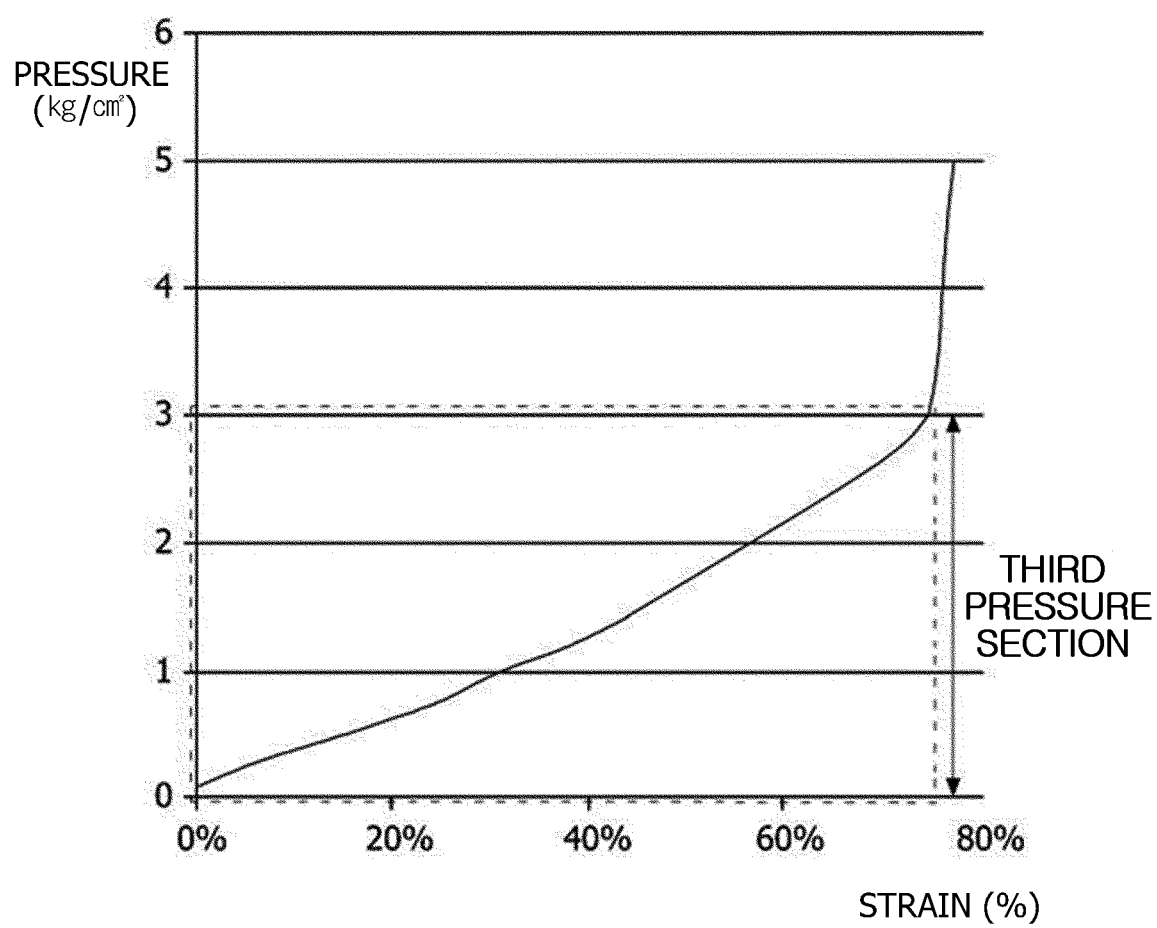
FIG. 4B is a graph showing a change in a thickness of an intermediate layer of FIG. 3 according to a pressure.

That is, the intermediate layer 20 having a structure in which the first, second, and third functional layers 20a, 20b, and 20c are stacked may include the second pressure section and the thickness of the intermediate layer 20 may linearly vary in a third pressure section including a range of a minimum pressure in the first pressure section to a maximum pressure in the fourth pressure section, and the third pressure section in which the thickness of the intermediate layer 20 varies linearly ranges from 0 kg/cm² to 3 kg/cm², as shown in FIG. 4B.

Further, the first and second functional layers 20a and 20b should satisfy the above Expression 1, and the first and third functional layers 20a and 20c should satisfy the following Expression 2.

$$1 < CFD_{third\ functional\ layer} 25\% / CFD_{first\ functional\ layer} 25\% \leq 20 \qquad \text{Expression 2}$$

As shown in Expression 2, $CFD_{first\ functional\ layer} 25\%$, which is a pressure at which the thickness of the first functional layer 20a is reduced by 25%, is lower than $CFD_{third\ functional\ layer} 25\%$, which is a pressure at which the thickness of the third functional layer 20c is reduced by 25%. This is because the maximum pressure in the first pressure section is lower than the maximum pressure in the fourth pressure section.

Further, when the $CFD_{third\ functional\ layer} 25\%$ is more than 20 times of the $CFD_{first\ functional\ layer} 25\%$, the intermediate layer 20 is difficult to be deformed by an external pressure, and thus $CFD_{third\ functional\ layer} 25\% / CFD_{first\ functional\ layer} 25\% \leq 20$ is preferable.

As described above, in the pressure sensing element according to the embodiment of the present invention, the intermediate layer 20 disposed between the first and second electrode layers 10 and 30 includes at least two functional layers 20a, 20b, and 20c having different sections in which thicknesses thereof linearly vary according to a pressure, and thus a pressure range in which the intermediate layer 20 can sense the pressure is increased.

Hereinafter, the intermediate layer 20 will be described in detail.

As described above, the intermediate layer 20 has a structure in which at least two first and second functional layers 20a and 20b having different sections in which thicknesses thereof linearly vary according to a pressure are stacked.

The first and second functional layers 20a and 20b may include a conductive filler having elasticity and a restoring force, but the present invention is not limited thereto. The first and second functional layers 20a and 20b may be selected from the group consisting of polyurethane, silicone, and a thermoplastic elastomer, and the conductive filler may be selected from the group consisting of carbon, a metal, ceramic, and a conductive polymer.

In the case in which the pressure sensing element is a capacitance type element, the first and second functional layers 20a and 20b may be dielectric layers having a dielectric constant. In this case, when a pressure is applied to the pressure sensing element, capacitance between the first electrode patterns 10a, 10b, 10c, and 10d and the second electrode patterns 30a, 30, 30c, and 30d varies according to a change in the thicknesses of the first and second functional layers 20a and 20b.

Further, in the case in which the pressure sensing element is a resistance type element, when a pressure is applied to the pressure sensing element, resistance values in the first electrode patterns 10a, 10b, 10c, and 10d and the second electrode patterns 30a, 30, 30c, and 30d may vary according to the change in the thicknesses of the first and second functional layers 20a and 20b.

Specifically, as shown in FIGS. 1 and 3, when the first electrode patterns 10a, 10b, 10c, and 10d and the second electrode patterns 30a, 30, 30c, and 30d are arranged in directions crossing each other, the pressure sensing element may sense the pressure and may detect a position at which the pressure is applied. The position at which the pressure is applied may be detected through regions in which the first electrode patterns 10a, 10b, 10c, and 10d and the second electrode patterns 30a, 30, 30c, and 30d cross.

However, the first electrode patterns 10a, 10b, 10c, and 10d and the second electrode patterns 30a, 30, 30c, and 30d may be arranged in directions parallel to each other.

Figure 5:
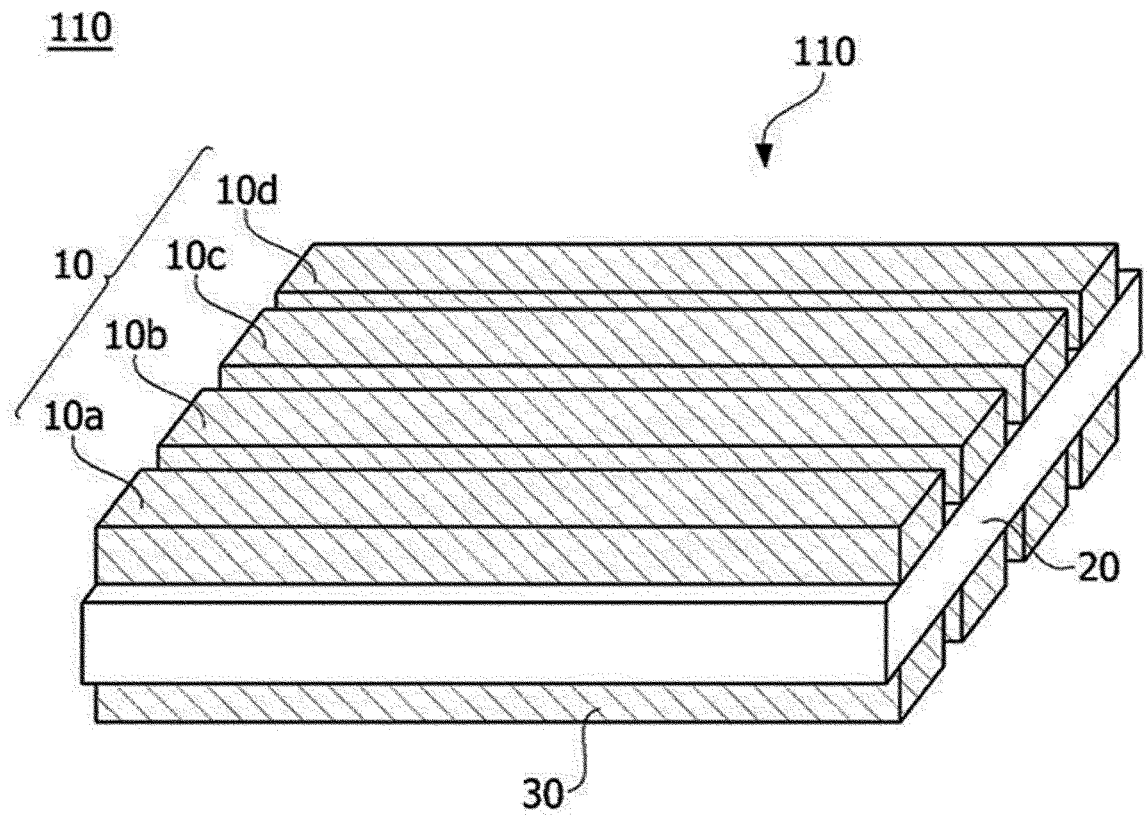
FIG. 5 is a perspective view of a pressure sensing element according to still another embodiment of the present invention.

FIG. 5 is a perspective view of a pressure sensing element according to still another embodiment of the present invention.

As shown in FIG. 5, when first electrode patterns 10a, 10b, 10c, and 10d of a first electrode layer 10 are arranged in parallel in a first direction, second electrode patterns 30a, 30, 30c, and 30d of a second electrode layer 30 may also be arranged in the first direction parallel to the first direction. The pressure sensing element of FIG. 5 may only perform a pressure sensing function.

Therefore, the pressure sensing element according to the embodiment of the present invention may easily adjust formation directions of the first electrode patterns 10a, 10b, 10c, and 10d and the second electrode patterns 30a, 30, 30c, and 30d.

The pressure sensing element according to the embodiment of the present invention as described above may be applied to various fields such as mats, wallpapers, seats, insoles, and the like.

Figure 6:
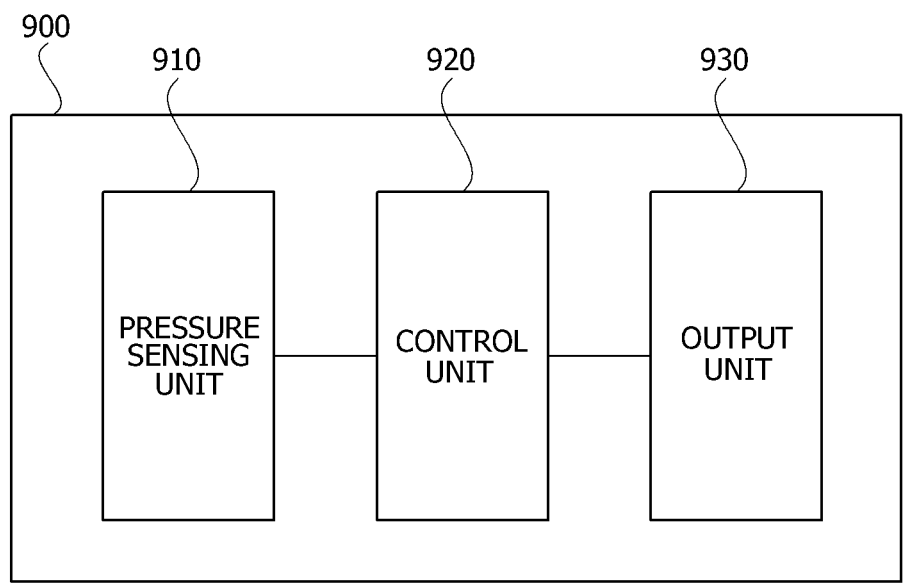
FIG. 6 is a block diagram of a safety apparatus including the pressure sensing element according to one of the embodiments of the present invention.
Figure 7:
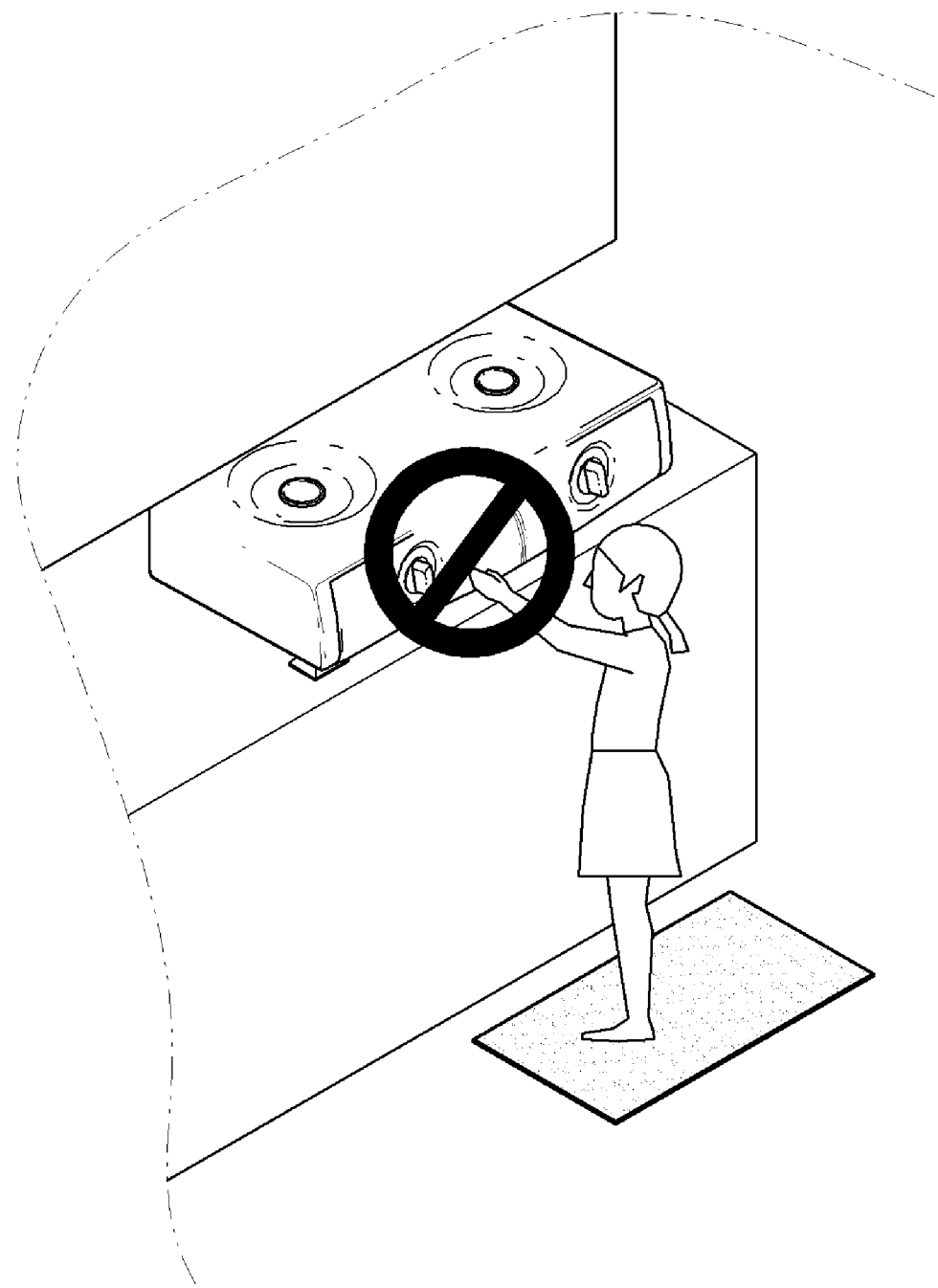
FIG. 7 is a view showing an example in which the safety apparatus of FIG. 6 is applied in the home.

FIG. 6 is a block diagram of a safety apparatus including the pressure sensing element according to one of the embodiments of the present invention. FIG. 7 is a view showing an example in which the safety apparatus of FIG. 6 is applied in the home.

Referring to FIG. 6, a safety apparatus 900 includes a pressure sensing unit 910, a control unit 920, and an output unit 930. The pressure sensing unit 910 represents the pressure sensing elements described in FIGS. 1 to 4B. That is, the pressure sensing unit 910 includes a first electrode layer including a plurality of first electrode patterns arranged in parallel in a first direction, a second electrode layer including a plurality of second electrode patterns arranged in parallel in a second direction crossing the first direction, and an intermediate layer disposed between the first electrode layer and the second electrode layer.

The control unit 920 generates a control signal according to an external pressure applied to the pressure sensing unit 910. In this case, the control unit 920 may measure the pressure applied to the pressure sensing unit 910 through a change in a thickness of the intermediate layer and generate a control signal according to the measured pressure. In this case, the control signal may be an alarm signal or a lock signal. The output unit 930 outputs the control signal.

For example, the pressure sensing unit 910 may be included in a mat of FIG. 7, and the control unit 920 and the output unit 930 may be included in a separate apparatus. When a child rises on the mat, the thickness of the intermediate layer of the pressure sensing unit 910 included in the mat may be reduced and the control unit 920 may measure the pressure applied to the mat based on a change in the thickness of the intermediate layer. When it is determined through the pressure applied to the mat that the child rises on the mat, the control unit 920 may generate a control signal for locking a home appliance or a gas range around the mat or for outputting an alarm. When the output unit 930 outputs the control signal, the home appliance or the gas range around the mat may be automatically locked or an alarm such as a buzzer or the like may be output.

While the example embodiments of the present invention and their advantages have been described above in detail, it should be understood that various changes, substitutions and alterations may be made herein without departing from the scope of the invention as defined by the following claims.

The invention claimed is:

1. A pressure sensing element comprising:
an intermediate layer having a structure in which at least two functional layers are stacked, wherein the at least two functional layers includes a first functional layer and a second functional layer;
a first electrode layer disposed on one surface of the intermediate layer and including a plurality of first electrode patterns; and
a second electrode layer disposed on an opposing surface of the intermediate layer to overlap the first electrode layer with the intermediate layer between the first electrode layer and the second electrode layer, the first functional layer is to face the plurality of first electrode patterns, and the second functional layer is to face the second electrode layer such that the second functional layer is between the first functional layer and the second electrode layer,
wherein a thickness of the first functional layer varies based on pressure applied to the pressure sensing element, the thickness of the first functional layer is to linearly vary within a first strain percentage range of the first functional layer when the applied pressure is within a first pressure range, and the thickness of the first functional layer is to vary at a different rate within a second strain percentage range of the first functional layer when the applied pressure is equal to or greater than pressure in the first pressure range, wherein the first pressure range is a pressure amount that ranges from a first pressure to a second pressure, the first strain percentage range of the first functional layer is a strain percentage that ranges from a first strain percentage to a second strain percentage, and
a thickness of the second functional layer varies based on pressure applied to the pressure sensing element, the thickness of the second functional layer is to linearly vary within a second strain percentage range of the second functional layer when the applied pressure is within a second pressure range, the thickness of the second functional layer is to vary at a different rate within a first strain percentage range of the second functional layer when the applied pressure is equal to or less than pressure in the second pressure range, and the thickness of the second functional layer is to vary at a different rate within a third strain percentage range of the second functional layer when the applied pressure is equal to or greater than pressure within the second pressure range, wherein the second pressure range is a pressure amount that ranges from a third pressure to a fourth pressure, the first strain percentage range of the second functional layer is a strain percentage that ranges from a third strain percentage to a fourth strain percentage, the second strain percentage range of the second functional layer is a strain percentage that ranges from the fourth strain percentage to a fifth strain percentage, and the third strain percentage range of the second functional layer is a strain percentage that is equal to or great than the fifth strain percentage, wherein the fifth strain percentage is greater than the fourth strain percentage, and a maximum tolerable pressure that the first functional layer can withstand within the first pressure range is equivalent to a minimum amount of pressure within the second pressure range, wherein the maximum tolerable pressure within the first pressure range is the second pressure, and the minimum amount of pressure within the second pressure range is the third pressure, wherein the first strain percentage range of the first functional layer is greater than the second strain percentage range of the first functional layer, and wherein the second strain percentage range of the second functional layer is greater than the first strain percentage range of the second functional layer.

2. The pressure sensing element of claim 1, wherein a thickness of the intermediate layer is to linearly vary when the applied pressure is within a third pressure range, the third pressure range is a pressure amount including a range from a minimum amount of pressure within the first pressure range to a maximum tolerable pressure that the second functional layer can withstand within the second pressure range.

3. The pressure sensing element of claim 1, wherein the intermediate layer has a structure in which the first functional layer is disposed on the second functional layer.

4. The pressure sensing element of claim 3, wherein $\text{CFD}_{\text{first functional layer}}25\%$, which is a pressure at which the thickness of the first functional layer is reduced by 25%, and $\text{CFD}_{\text{second functional layer}}25\%$, which is a pressure at which the thickness of the second functional layer is reduced by 25%, satisfy the following Expression 1:

$$1 < \text{CFD}_{\text{second functional layer}}25\%/\text{CFD}_{\text{first functional layer}}25\% \leq 20, \quad \text{Expression 1}$$

(Compression Force Deflection; CFD).

5. The pressure sensing element of claim 3, wherein, when a third functional layer is further disposed below the second functional layer such that the third functional layer is between the second functional layer and the second electrode layer, a thickness of the third functional layer is to linearly vary when the applied pressure is within a fourth pressure range, a maximum tolerance pressure within the fourth pressure range is higher than a maximum tolerance pressure within the second pressure range, and a minimum amount of pressure within the fourth pressure range is within a range of pressures within the second pressure range.

6. The pressure sensing element of claim 5, wherein a thickness of the intermediate layer is to linearly vary when the applied pressure is within a third pressure range, the third pressure range is a pressure amount that includes a range from a minimum amount of pressure within the first pressure range to the maximum tolerance pressure within the fourth pressure range.

7. The pressure sensing element of claim 5, wherein $\text{CFD}_{\text{first functional layer}}25\%$, which is a pressure at which the thickness of the first functional layer is reduced by 25%, and $\text{CFD}_{\text{third functional layer}}25\%$, which is a pressure at which the thickness of the third functional layer is reduced by 25%, satisfy the following Expression 2:

$$1 < \text{CFD}_{\text{third functional layer}}25\%/\text{CFD}_{\text{first functional layer}}25\% \leq 20 \quad \text{Expression 2}$$

8. The pressure sensing element of claim 1, further comprising an adhesion layer disposed between the first functional layer and the second functional layer.

9. The pressure sensing element of claim 1, wherein the first and second functional layers include a conductive filler.

10. The pressure sensing element of claim 1, wherein the first electrode patterns are arranged in a first direction, and the second electrode layer includes a plurality of second electrode patterns arranged in the first direction.

11. The pressure sensing element of claim 1, wherein:
the first electrode patterns are arranged in a first direction; and
the second electrode pattern includes a plurality of second electrode patterns arranged in a second direction crossing the first direction.

12. An apparatus comprising:
a pressure sensing element including an intermediate layer having a structure in which at least two functional layers are stacked, a first electrode layer disposed on one surface of the intermediate layer and including a plurality of first electrode patterns, and a second electrode layer disposed on an opposing surface of the intermediate layer to overlap the first electrode layer with the intermediate layer between the first electrode layer and the second electrode layer, the at least two functional layers including a first functional layer and a second functional layer, the first functional layer is to face the plurality of first electrode patterns, and the second functional layer is to face the second electrode layer such that the second functional layer is between the first functional layer and the second electrode layer, wherein a thickness of the first functional layer varies based on pressure applied to the pressure sensing element, the thickness of the first functional layer is to linearly vary within a first strain percentage range of the first functional layer when the applied pressure is within a first pressure range, and the thickness of the first functional layer is to vary at a different rate within a second strain percentage range of the first functional layer when the applied pressure is equal to or greater than pressure in the first pressure range, wherein the first pressure range is a pressure amount that ranges from a first pressure to a second pressure, the first strain percentage range of the first functional layer is a strain percentage that ranges from a first strain percentage to a second strain percentage, and a thickness of the second functional layer varies based on pressure applied to the pressure sensing element, the thickness of the second functional layer is to linearly vary within a second strain percentage range of the second functional layer when the applied pressure is within a second pressure range, the thickness of the second functional layer is to vary at a different rate within a first strain percentage range of the second functional layer when the applied pressure is equal to or less than pressure in the second pressure range, and the thickness of the second functional layer is to vary at a different rate within a third strain percentage range of the second functional layer when the applied pressure is equal to or greater than pressure in the second pressure range, wherein the second pressure range is a pressure amount that ranges from a third pressure to a fourth pressure, the first strain percentage range of the second functional layer is a strain percentage that ranges from a third strain percentage to a fourth strain percentage, the second strain percentage range of the second functional layer is a strain percentage that ranges from the fourth strain percentage to a fifth strain percentage, and the third strain percentage range of the second functional layer is a strain percentage that is equal to or great than the fifth strain percentage, wherein the fifth strain percentage is greater than the fourth strain percentage, a maximum tolerable pressure that the first functional layer can withstand within the first pressure range is equivalent to a minimum amount of pressure within the second pressure range, wherein the maximum tolerable pressure within the first pressure range is the second pressure, and the minimum amount of pressure within the second pressure range is the third pressure, wherein the first strain percentage range of the first functional layer is greater than the second strain percentage range of the first functional layer, and wherein the second strain percentage range of the second functional layer is greater than the first strain percentage range of the second functional layer;
a control unit configured to generate a control signal according to a change in a thickness of the intermediate layer; and
an output unit configured to output the control signal.

13. The apparatus of claim 12, wherein the control unit measures a pressure applied to the pressure sensing element according to the thickness of the intermediate layer and generates a control signal according to the measured pressure.

14. The apparatus of claim 12, wherein a thickness of the intermediate layer of the pressure sensing element is to linearly vary when the applied pressure is within a third pressure range, the third pressure range is a pressure amount including a range of a minimum amount of pressure within the first pressure range to a maximum tolerable pressure that the second functional layer can withstand within the second pressure range.

15. The apparatus of claim 12, wherein, when a third functional layer is further disposed below the second functional layer such that the third functional layer is between the second functional layer and the second electrode layer, a thickness of the third functional layer is to linearly vary when the applied pressure is within a fourth pressure range, a maximum tolerance pressure within the fourth pressure range is higher than a maximum tolerance pressure within the second pressure range, and a minimum amount of pressure within the fourth pressure range is within a range of pressures within the second pressure range.

16. The apparatus of claim 15, wherein a thickness of the intermediate layer is to linearly vary when the applied pressure is within a third pressure range, the third pressure range is a pressure amount that includes a range from a minimum amount of pressure within the first pressure range to the maximum tolerance of pressure within the fourth pressure range.

17. The apparatus of claim 12, wherein the first electrode patterns are arranged in a first direction, and the second electrode layer includes a plurality of second electrode patterns arranged in the first direction.

18. The apparatus of claim 12, wherein:
the first electrode patterns are arranged in a first direction; and
the second electrode layer includes a plurality of second electrode patterns arranged in a second direction crossing the first direction.

* * * * *